W. STRAIT.
STEERING MECHANISM FOR TRACTION MACHINES.
APPLICATION FILED NOV. 9, 1912.
1,131,288.
Patented Mar. 9, 1915.
2 SHEETS—SHEET 1.
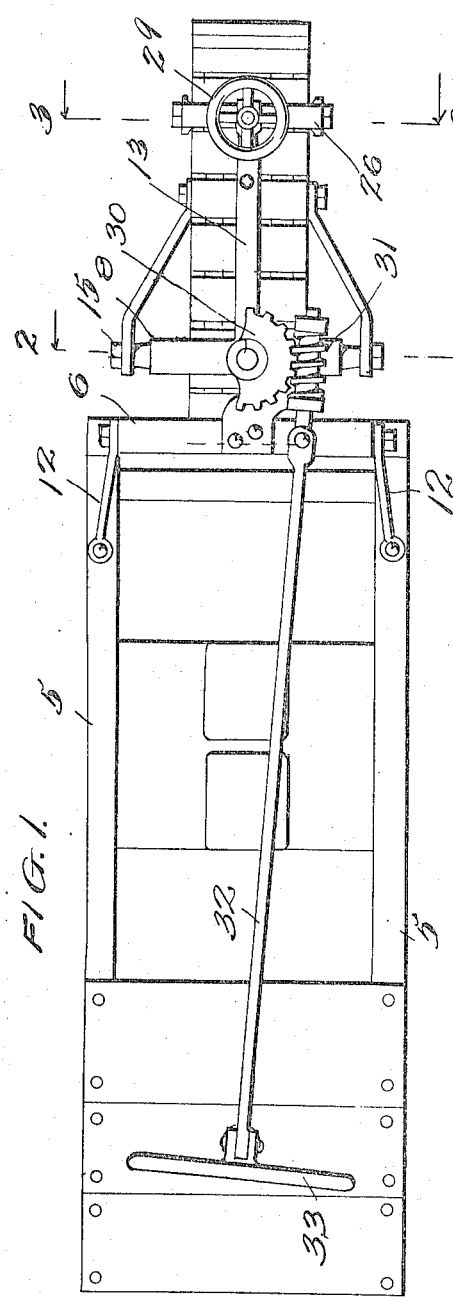
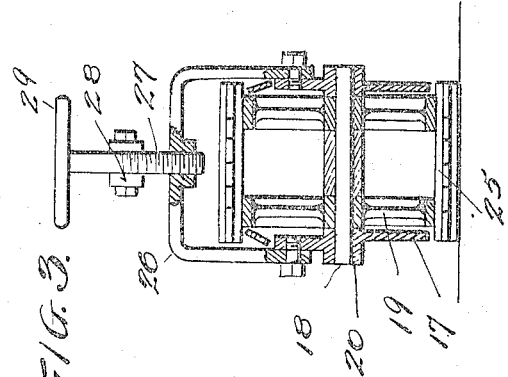
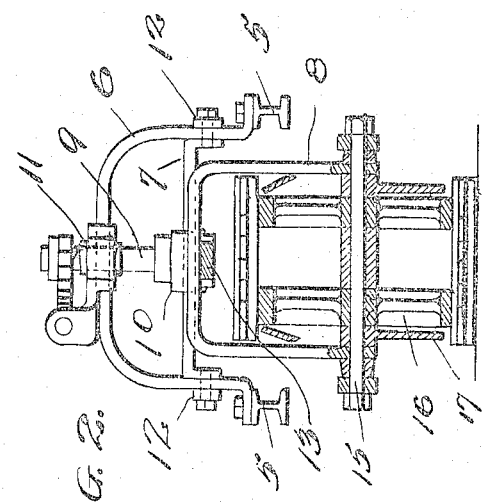
WITNESSES
INVENTOR
William Strait
by Bach, Baker & Smith
Attorneys

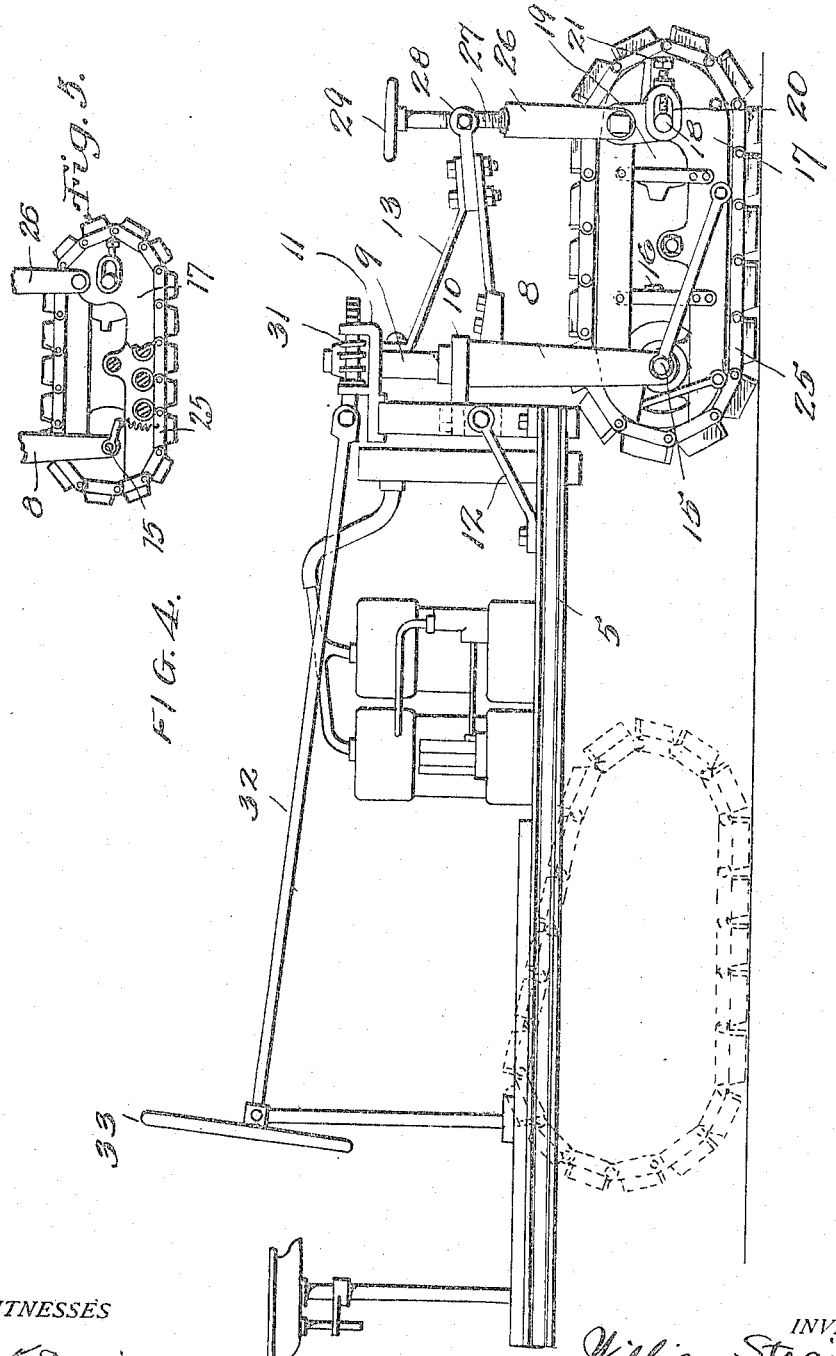

UNITED STATES PATENT OFFICE.

WILLIAM STRAIT, OF APPLETON, WISCONSIN.

STEERING MECHANISM FOR TRACTION-MACHINES.

1,131,288.

Specification of Letters Patent.

Patented Mar. 9, 1915.

Application filed November 9, 1912. Serial No. 730,473.

*To all whom it may concern:*

Be it known that I, WILLIAM STRAIT, a citizen of the United States, residing at Appleton, Wisconsin, have invented a new and Improved Steering Mechanism for Traction-Machines, of which the following is a specification.

My invention relates to a front carrying device or tractor for traction machines, and to the adaptation of the front portion of such a machine to the steering tractor so that it can be turned as nearly at a right angle to the machine as may be desired for steering.

The characteristics and advantages of the invention will be sufficiently pointed out hereafter in connection with a detailed description of the accompanying drawing, which shows an exemplifying structure embodying the invention.

Figure 1 is a plan view; Fig. 2 a section on the line 2—2 of Fig. 1; Fig. 3 is a section on the line 3—3 of Fig. 1, and Fig. 4 is a side elevation.

The rear portion of the machine is only partially indicated to give the proper location of the steering tractor in a complete mechanism. The side frame members 5 are connected by a transverse, upwardly arched member 6 and this is reinforced by a cross member 7 considerably above the side frame members. A steering fork 8 has a stem 9 vertically journaled in lugs 10, 11, carried, respectively, by frame members 7 and 6. These lugs extend forward from the frame members and hold the steering fork well clear of the front end of the frame. The arch, formed by frame members 6 and 7, may be further reinforced and braced upon the frame by corner braces 12.

Connected to the steering stem 9 and fork 8 is an outrigger or strut 13 to support the forward end of the tractor, as will appear. The main fork 8 carries a shaft 15 on which is supported the rear tractor sprocket 16. Radius members 17 are also supported by the axle and at the front end of these radius members is carried the front axle 18 supporting the front sprocket 19. The axle 18 is adjustable in the radius members by means of slots 20 and screws 21. The radius members 17, one at each side of the sprockets, serve also to carry roller bearings to hold the tractor belt firmly in engagement with the ground between the sprockets.

The linked tractor chain or belt passing around sprockets 16 and 19 is indicated by character 25.

To the front ends of the radius members 17 is pivoted a lifting fork 26, and the upper end of this is connected by a screw 27 and nut 28 with the front end of strut 13. On the upper end of the screw is a hand wheel 29. Steering stem 9 carries at its upper end a gear sector 30 and this is engaged by a worm 31 carried in suitable bearings in bracket 11. The worm is turned by a universally jointed shaft 32 leading back to steering wheel 33.

The direction of the machine is controlled in an obvious way by rotating the hand wheel and changing the direction of the tractor belt. Owing to the arched construction of the front end of the frame and the outward hanging of the main fork 8, the tractor may be turned, if necessary, to a complete right-angle without interference by the frame. In some cases the tractor may be left flat on the ground, as shown in Fig. 4, but in other cases to facilitate turning or traveling over soft or uneven ground the front end of the tractor is more or less elevated. This is easily accomplished by rotating screw 27. When the front end is elevated even slightly, the whole tractor pivots around to a point directly under the rear axle 15. On smooth ground steering can be easily effected even when the tractor is flat on the ground by means of the powerful steering worm and large hand-wheel.

The steering tractor is preferably mounted in the longitudinal center line of the machine. When the front end of the tractor is raised for turning, in the turning action the tractor belt pivots upon its center and this center is, of course, in the same longitudinal center line of the machine. Steering is by this arrangement very much facilitated and can be accomplished much easier than, for instance, in machines which have a plurality of steering tractors.

Evidently, the invention is capable of embodiment in various forms and I have shown only the best construction designed by me up to the present time.

I claim:

1. In a traction machine, the combination of a frame having an upwardly arched front end, bearings carried by said front end, a main fork revolubly mounted in the bearings, an axle carried by the fork, a forward strut carried by the fork, a front axle depending from the strut, a belt wheel on each of the axles, and a tractor belt passing around the wheels.

2. In a traction machine, the combination of a frame, upwardly arched front members thereon, bearings extended forward from said arched members, a main fork pivoted in the bearings, an axle and sprocket carried by said fork, radius members extending forward from the axle, a front axle carried by said radius members, a lifting fork connected to said radius members, a strut extending forward from the main fork, a screw connected with the lifting fork and engaging a nut carried by the strut for lifting the front end of the radius members, a sprocket carried by the front axle, and a tractor belt passing around the sprockets.

3. In a traction machine, the combination of side frame members, upwardly arched front members connected to said side members, bearings extended forward from said front members and a steering tractor pivotally carried in said bearings.

4. In a traction machine, the combination of side frame members, upwardly arched front members connected to the side members, a main fork pivoted to said front members, a sprocket carried by said fork, another sprocket forward of the one first mentioned, a forward strut carried by said fork and a lifting fork connected to said strut.

5. In a traction machine, the combination of side frame members, upwardly arched front members connected to the side members, a main fork pivoted to said front members, a sprocket carried by said fork, another sprocket forward of the one first mentioned, a forward strut carried by said fork, a lifting fork connected to said strut, and radius members connecting the axes of the two sprockets.

6. In a traction machine, the combination of a frame, a steering tractor in the center line of the machine, a pivotal connection between the tractor and frame to permit steering movement of the tractor, and means for elevating the front end of the tractor to reduce the ground contact area and cause the tractor to pivot near one end and substantially under said pivotal connection in turning.

7. In a traction machine, the combination of side frame members, a cross frame member, a steering fork revolubly mounted therein, a shaft carried by the fork, a pulley thereon, tractor-frame members extending from the fork, a shaft carried by said tractor-frame members, a pulley on said shaft, and a tractor belt passing about said pulleys.

8. In a traction machine, the combination of side frame members, a cross frame member, a steering fork pivoted therein, a shaft carried by the fork, a pulley thereon, tractor-frame members extending forward from the fork, a shaft carried by said tractor-frame members, a pulley on said shaft, a tractor belt passing about said pulleys, means for raising the front end of the tractor belt, said parts being constructed and arranged so that in steering the tractor belt pivots upon the center in the longitudinal center line of the machine.

9. In a traction machine, the combination of side frame members, a cross frame member, a steering fork pivotally connected thereto, a shaft carried by the fork, a pulley thereon, tractor-frame members extending from the fork, a shaft carried by said tractor-frame members, a pulley on said shaft, a tractor belt passing about said pulleys, rollers carried by the tractor-frame members and engaging the lower stretch of the belt to insure proper ground contact.

10. In a traction machine, the combination of a frame, a steering tractor, a pivotal steering connection between the tractor and the frame, the axis of said pivotal connection approximately intersecting the longitudinal center of the tractor, and means for elevating the front end of the tractor to reduce the ground contact area and cause the tractor to pivot substantially on the axis of said steering pivot in turning.

WILLIAM STRAIT.

Witnesses:
 GEORGE T. RICHARD,
 P. A. KORNELY.